US006493913B2

(12) United States Patent
Streubel et al.

(10) Patent No.: US 6,493,913 B2

(45) Date of Patent: Dec. 17, 2002

(54) DEVICE FOR HYDRAULIC HIGH PRESSURE FORMING OF A TUBULAR COMPONENT OR A BLANK

(75) Inventors: Wolfgang Streubel, Detmold; Thomas Harbarth, Paderborn, both of (DE)

(73) Assignee: Benteler AG, Paderborn (DE)

( * ) Notice: Subject to any disclaimer, the term of this patent is extended or adjusted under 35 U.S.C. 154(b) by 0 days.

(21) Appl. No.: 09/726,795

(22) Filed: Nov. 30, 2000

(65) Prior Publication Data

US 2001/0005929 A1 Jul. 5, 2001

(51) Int. Cl.[7] .......................... B23P 23/00; B21B 37/00

(52) U.S. Cl. ............................ 29/33 D; 29/33.7; 72/58; 72/60

(58) Field of Search ............................... 29/33 D, 33 T; 72/58, 59, 60, 61

(56) References Cited

U.S. PATENT DOCUMENTS

| | | | | |
|---|---|---|---|---|
| 4,265,102 A | * | 5/1981 | Shimakata | 72/58 |
| 4,362,037 A | * | 12/1982 | Whitlfield | 72/58 |
| 4,558,579 A | * | 12/1985 | Petkov et al. | 29/33 D |

FOREIGN PATENT DOCUMENTS

| | | | | |
|---|---|---|---|---|
| FR | 1472282 | * | 3/1967 | 72/58 |
| JP | 61-132232 | * | 6/1986 | 72/58 |
| JP | 273221 | * | 12/1986 | 72/58 |
| SU | 1306617 | * | 4/1987 | 72/58 |

* cited by examiner

*Primary Examiner*—William Briggs
(74) *Attorney, Agent, or Firm*—Friedrich Kueffner

(57) ABSTRACT

In a device for hydraulic forming of a tubular component under high inner pressure compressive conditions in a lower die and an upper die of a forming tool, the upper die can be coupled for relative limited movement by at least one piston-cylinder unit containing a hydraulic fluid with the press plunger of a travel-limited mechanical press and the cylinder interior of the piston-cylinder unit can be coupled for providing fluid communication with the interior of the component. Alternatively, in the device for hydraulic forming of a blank under high pressure compressive conditions in a forming tool comprising a lower die and an upper die, the upper die can be coupled for relative limited movement by at least one piston-cylinder unit containing a hydraulic fluid with the press plunger of a travel-limited mechanical press and the cylinder chamber of the piston-cylinder unit can be coupled for establishing fluid communication with the forming space of the forming tool.

10 Claims, 2 Drawing Sheets

DEVICE FOR HYDRAULIC HIGH PRESSURE FORMING OF A TUBULAR COMPONENT OR A BLANK

BACKGROUND OF THE INVENTION

1. Field of the Invention

The invention relates to hydraulic forming of a tubular component under high pressure compressive conditions.

2. Description of the Related Art

In the context of hydraulic forming of a tubular component it is known to place a tubular component into an initially open forming tool comprised of an upper die and a lower die, to fill it with a liquid forming medium, and to seal the ends of the component by means of sealing mandrels. After closing the forming tool, a hydraulic pressure is generated in the component in order to form the component to the preset contours within the forming tool.

This process is based on a hydraulic closed press which is designed with respect to control considerations such that during the hydroforming process the press closes the forming tool for an extended period of time. The closing duration, for example, for vehicle components such as longitudinal beams and transverse supports, is in the range of 5 to 10 seconds. This results in cycle times in the range of approximately 30 to 40 seconds for producing each finished part, this duration including the time required for introducing the component to be formed into the forming tool as well as for the removal of the formed component from the forming tool.

SUMMARY OF THE INVENTION

It is an object of the present invention to provide a device for hydraulic forming of a tubular component or a blank under high pressure compressive conditions which, while providing a problem-free integration into a travel-limited mechanical press, is constructively simple and easy to handle.

In accordance with the present invention, this is achieved in that, in the device for hydraulic forming of a tubular component under high inner pressure compressive conditions in a lower die and an upper die of a forming tool, the upper die can be coupled for a relative limited movement by at least one piston-cylinder unit containing a hydraulic fluid with the press plunger of a travel-limited mechanical press and in that the cylinder interior (cylinder chamber) of the piston-cylinder unit can be coupled with the interior of the component for providing fluid communication.

In accordance with the present invention, this is also achieved in that, in the device for hydraulic forming of a blank under high pressure compressive conditions in a forming tool comprising a lower die and an upper die, the upper die can be coupled for a relative limited movement by at least one piston-cylinder unit containing a hydraulic fluid with the press plunger of a travel-limited mechanical press and in that the cylinder interior of the piston-cylinder unit can be coupled with the forming space of the forming tool for providing fluid communication.

The invention combines in an advantageous manner a forming tool with lower die and upper die for hydraulic forming of tubular components under high inner pressure compressive conditions or for hydraulic forming of blanks under high pressure compressive conditions with a travel-limited mechanical press known, for example, in the form of an eccentric press, crank press or knuckle joint lever press.

A characteristic feature of such a mechanical press is a continuous movement performed in a continuous operation.

In contrast, high pressure forming occurring during the forming process requires a completely closed forming tool with a closing force that is sufficiently great over the time period of the forming step. These two contrary conditions are reconciled by the invention in that the upper die of the forming tool can be coupled by at least one piston-cylinder unit containing hydraulic fluid with a press plunger of a mechanical press so as to be moveable to a limited extent relative to the press plunger. As a result of such a configuration with a piston-cylinder unit, a quasi hydraulic cushion between the upper die and the press plunger is generated. This hydraulic cushion then allows a decoupling of the continuous plunger movement from the forming tool for the time period of the high pressure forming action on a tubular component or a blank in the range of the bottom dead center position. At the same time, the piston-cylinder unit is employed in order to use the fluid contained in the piston-cylinder unit directly for forming the component or blank. For this purpose, the cylinder of the piston-cylinder unit is connectable with the interior of the component or with the forming space of the forming tool for providing or establishing fluid communication. As a result of this, a separate pressure intensifier as well as corresponding hydraulic apparatus and components can be omitted.

The advantages of the configuration according to the invention reside in a substantial reduction of the cycle times, a reduction of the investment costs for the components required for pressure generation, as well as a considerably reduced control expenditure. Moreover, this results in the great advantage that in a manufacturing facility the already present capacities of mechanical presses can now be used for the high pressure forming especially of small batch numbers of tubular components or blanks to be shaped or formed.

Depending on the type and contour course of the respective tubular component or of a blank to be formed, only one piston-cylinder unit or several piston-cylinder units are introduced between the upper die and the press plunger. In particular, the arrangement of several smaller piston-cylinder units along a component or blank contour and a direct hydraulic connection, wherein the piston surface corresponds to the projected surfaces of component or the blank, can ensure that at any moment of the forming process a force equilibrium between the piston-cylinder unit and the component or the blank is present. In this arrangement, the further advantage is realized that the elastic deformations in the forming tool can be minimized which provides an improved manufacturing precision.

The filling of a tubular component can be realized with conventional hydraulic apparatus. However, conceivable is also a variant in which filling of the component is carried out in an immersion tank.

Since the piston-cylinder unit is formed as a separate device that can be detached from the upper die as well as the press plunger, it can be used with a flexible configuration for different forming tools and mechanical presses.

An advantageous further embodiment of the invention resides in that the piston of the piston-cylinder unit can be detachably fastened by means of a piston plate to the press plunger and the cylinder can be detachably fastened by means of a cylinder plate to the upper die. The piston plate, moreover, has return members fixedly arranged thereat which are connected to the cylinder or the cylinder plate so as to be relatively moveable. The return members can be, for example, guide rods which penetrate consoles on the cylinder or the cylinder plate so as to be movable relative to the cylinder or cylinder plate. They are provided at their free end with engaging heads which engage from below the consoles or the cylinder plate and, upon upward movement of the press plunger, lift the cylinder or the cylinder plate and thus the upper die.

When a line is provided between the piston-cylinder unit and the forming tool and a fluid separator is integrated in the line, in the area of the piston-cylinder unit a hydraulic oil, optionally with suitable additives, can be advantageously used and for forming the tubular component or the blank an aqueous fluid with only minimal lubricant additives can be used. In this connection, it may also be expedient to design the fluid separator as a pressure intensifier with only a minimal intensifying ratio. As a result of this, additional free spaces are available for designing and adapting the piston-cylinder unit relative to a tubular component or a blank.

In order to ensure during forming a complete adaptation of a tubular component or of a blank to the forming space, the piston-cylinder unit is designed such that the volume displaced by it is greater than that which is required for forming. In order to receive this excess volume, the line between the piston-cylinder unit and the forming tool is provided with a pressure reducer with pressure control valve arranged downstream. The pressure control valve provided at the low pressure side of the pressure reducer has the effect that, only when a certain inner pressure is reached in the component or in the forming space, the volume displaced by the piston-cylinder unit is removed via the pressure reducer. This preset pressure corresponds to the pressure which is required for the complete filling of the forming space by the component or the adaptation of the blank to the contours of the forming space. Such a solution of the pressure or volume limitation is advantageous as a result of the very high pressures occurring during hydroforming in the range of 600 bar to 3,000 bar because for this application a direct pressure limitation by commercially available pressure regulators is not possible.

DESCRIPTION OF THE PREFERRED EMBODIMENTS

Figure 1:
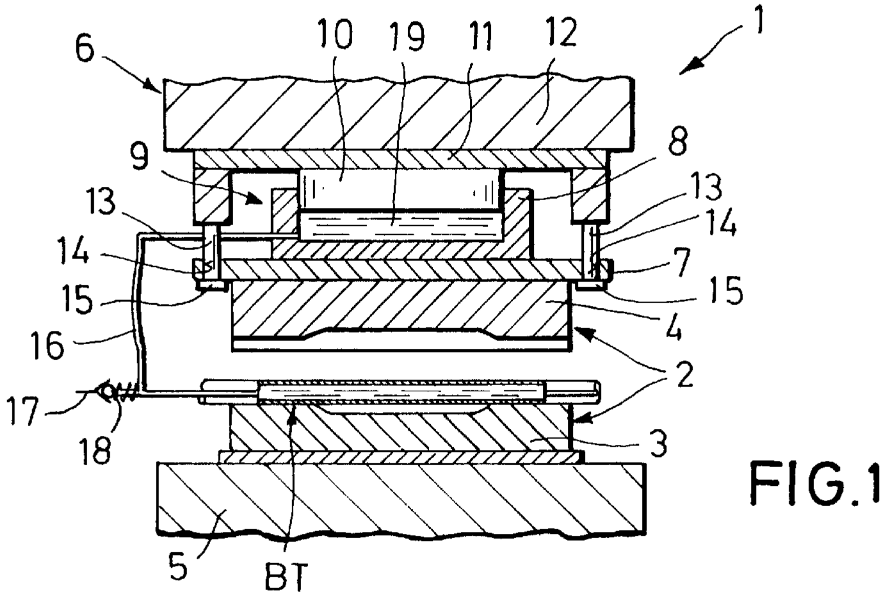
FIG. 1 shows schematically a vertical longitudinal section of a mechanical press for forming a tubular component under by high inner pressure compressive conditions, with the press being in the top dead center position.
Figure 2:
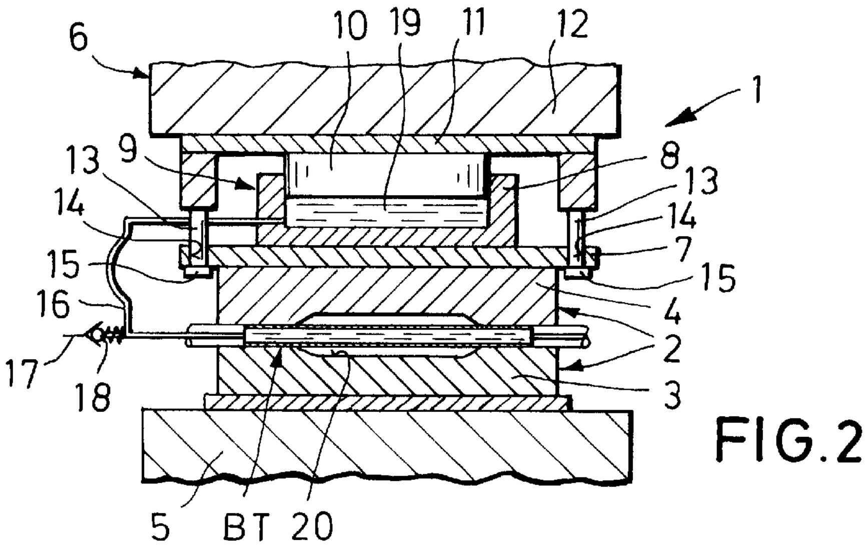
FIG. 2 shows schematically a vertical longitudinal section of a mechanical press for forming a tubular component under inner high pressure compressive conditions, with the forming tool being in the closed position.
Figure 3:
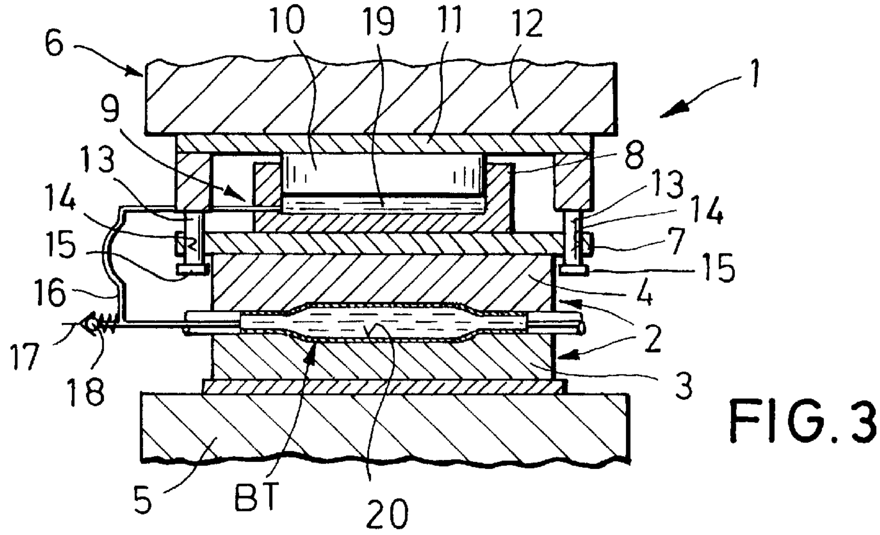
FIG. 3 shows schematically a vertical longitudinal section of a mechanical press for forming a tubular component under high inner pressure compressive conditions, with the press being in the bottom dead center position.

The device 1 illustrated in FIGS. 1 through 3 is designed for hydraulic forming of a tubular component BT under high inner pressure compressive conditions. The device 1 comprises a forming tool 2 with a lower die 3 and an upper die 4. The lower die 3 is detachably secured on a press table 5 of a travel-limited mechanical press 6 in the form of a crank press. The upper die 4 is detachably connected by means of a cylinder plate 7 with the cylinder 8 of a piston-cylinder unit 9. The piston 10 of the piston-cylinder unit 9 is detachably connected by means of a piston plate 11 with the press plunger 12 of the mechanical press 6.

Moreover, FIGS. 1 through 3 also show that rod-shaped return members 13 are fastened to the piston plate 11 which penetrate bores 14 in the cylinder plate 7 so as to be movable relative to the cylinder plate 7. The return members 13 have engaging heads 15 at their free ends.

In order to keep the drawings simple, in FIGS. 1 through 3 the conventional hydraulic apparatus required for operation of the device 1 are not illustrated. Only a line 16 between the piston-cylinder unit 9 and the forming tool 2 is schematically indicated which, as a result of its special configuration, also allows a movement of the piston-cylinder unit 9 relative to the forming tool 2. Moreover, an inlet line 17 for the forming fluid required for the forming step as well as a check valve 18 are illustrated.

The forming process of the component BT is performed approximately as follows:

According to the illustration of FIG. 1, the press plunger 12 is positioned together with the upper die 4 at the upper dead center point of the press 6. The engaging heads 15 of the return members 13 engage underneath the cylinder plate 7. The forming fluid is filled via the lines 17 and 16 into the cylinder interior 19 of the piston-cylinder unit 9 and into the component BT.

By rotating the crank (not illustrated) of the press 6, the press plunger 12 is moved downwardly.

The situation according to FIG. 2 shows the device 1 with the forming tool 2 in the closed position. The crank of the press 6 has however not yet reached the lower dead center point.

As a consequence, the press plunger 12 is moved farther downwardly so that, as a result of the forming tool 2 being closed, forming fluid is transferred by means of the piston 10 from the interior 19 of the cylinder 8 of the piston-cylinder unit 9 via the line 16 into the component BT so that the component BT begins to deform into the forming space 20 of the forming tool 2, as illustrated in FIG. 3, as a result of the pressure being generated by the forming fluid. The check valve 18 prevents the forming fluid from flowing out.

Once the crank has reached the lower dead center point according to FIG. 3, the forming of the component BT is completed.

The crank is turned farther and now begins to lift the press plunger 12. The forming tool 2 still remains closed. The press plunger 12 moves relative to the cylinder 8 of the piston-cylinder unit 9 in the upward direction. The rod-shaped return members 13 glide through the cylinder plate 7.

Once the engaging heads 15 of the return members 13 have reached the cylinder plate 7, the further upward movement of the press plunger 12 causes the cylinder 8 of the piston-cylinder unit 9 to also be lifted, and the upper die 4 is also lifted by means of the cylinder plate 7.

Once a sufficiently large spacing has been realized between the upper die 4 and the lower die 3, the formed component BT can be exchanged for a new component BT to be formed subsequently.

Once the crank of the press 6 has again reached the upper dead center point, the forming cycle is completed.

Figure 4:
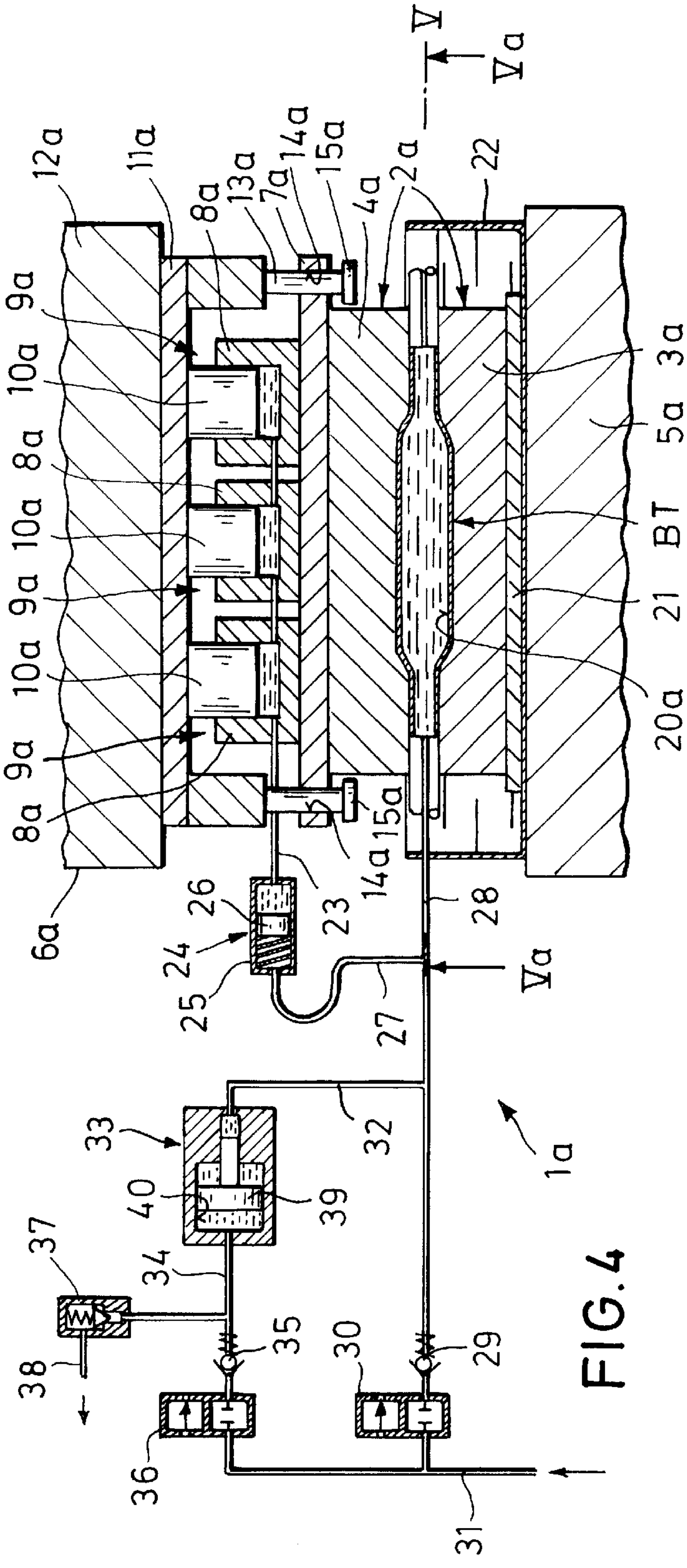
FIG. 4 illustrates a further embodiment of the device according to the invention in a view similar to that of FIGS. 1 through 3.
Figure 5:
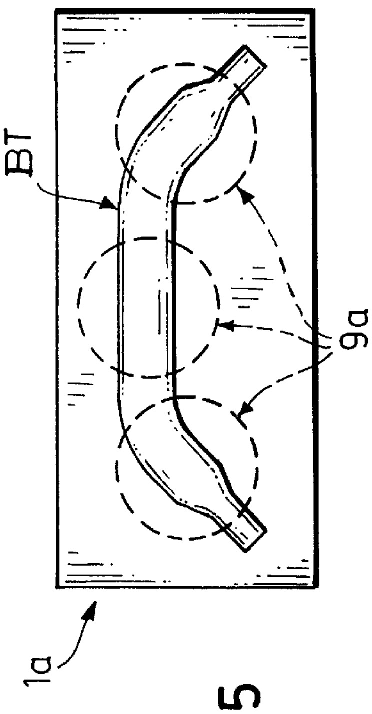
FIG. 5 shows a schematic cross-section of the illustration of FIG. 4 along the line V in the direction of arrows Va.

FIGS. 4 and 5 show a device 1*a* for hydraulic forming of a tubular component BT under high inner pressure compressive conditions, wherein an upper die 4*a* of a forming tool 2*a* can be coupled with a press plunger 12*a* of a travel-limited mechanical press 6*a* in the form of a crank press for a limited movement relative to one another by means of a total of three piston-cylinder units 9*a*. In this embodiment, the pistons 10*a* of the piston-cylinder units 9*a* are also detachably connected by means of a piston plate 11*a* with the press plunger 12*a*, while the cylinders 8*a* of the piston-cylinder units 9*a* are detachably connected by means of a cylinder plate 7*a* to the upper die 4*a* of the forming tool 2*a*. The lower die 3*a* of the forming tool 2*a* is detachably connected by means of a die plate 21 to the press table 5*a* of the mechanical press 6*a*. In this connection, it is also illustrated that the lower die 3*a* together with the die plate 21 is positioned in a catch reservoir 22 for the forming fluid.

The piston plate 11*a* is provided with rod-shaped return members 13*a* which penetrate bores 14*a* in the cylinder plate 7*a* for relative movement and which at their free ends have engaging heads 15*a*. As in the embodiment according to FIGS. 1 through 3, the engaging heads 15*a* are positioned adjacent to the upper die 4*a*.

The cylinder interiors 19*a* of the piston-cylinder units 9*a* are connected via a line 23 to a fluid separator 24. In the housing 25 of the fluid separator 24 an axially movable piston 26 is arranged which separates the fluid contained in the cylinder chambers 19*a*, for example, a hydraulic oil, from the forming fluid, for example, water provided with lubricating additives.

The fluid separator 24 is connected by a line 27 as well as a line 28 with the forming tool 2*a*. The line 28 connected to the forming tool 2*a* is connected via a check valve 29 with a switching valve 30 which, in turn, is connected to a supply line 31 for the forming fluid.

Moreover, a line 32 is connected to the line 28 connected to the forming tool 2*a* and extends to a pressure reducer 33. The pressure reducer 33 is, in turn, connected via a line 34 with a check valve 35 which is positioned upstream of a switching valve 36 which is arranged within the supply line 31. A pressure control valve 37 is connected within the line 34 between the check valve 35 and the pressure reducer 33. It is connected via a line 38 with a reservoir (not illustrated in the drawing).

In order to ensure a complete forming of the component BT to be formed into the forming space 20*a* of the forming tool 2*a*, the volume to be displaced by the piston-cylinder units 9*a* must be greater than the volume which is required for forming. The displaced excess volume is moved to the pressure reducer 33. Its piston 39 is moved to the left. At a predetermined pressure which is required for completely filling the forming space 20*a*, the forming fluid, present within the larger space 40 of the pressure reducer 33, is transferred via the pressure control valve 37 into the reservoir.

FIG. 5 shows the distribution of the piston-cylinder units 9*a* along the component BT which is bent to a trapezoidal shape in the plan view of the illustrated embodiment.

While specific embodiments of the invention have been shown and described in detail to illustrate the inventive principles, it will be understood that the invention may be embodied otherwise without departing from such principles.

What is claimed is:

1. A device for hydraulic forming of a tubular component under high inner pressure compressive conditions, the device comprising:

a forming tool comprising an upper die and a lower die;

a travel-limited mechanical press arranged above the forming tool and comprising a press plunger;

at least one piston-cylinder unit comprising a cylinder with an interior and a piston arranged in the interior of the cylinder, wherein the interior of the cylinder contains a hydraulic fluid;

wherein the press plunger is connected to the piston-cylinder unit remote from the upper die of the forming tool and wherein the at least one piston-cylinder unit is configured to act on the upper die to generated a limited relative movement between the upper die and the press plunger; and wherein the at least one piston-cylinder unit is configured to establish fluid communication between the interior of the cylinder and an inner space of the tubular component to be formed.

2. The device according to claim 1, wherein the piston of the at least one piston-cylinder unit comprises a piston plate configured to be detachably fastened to the press plunger, wherein the cylinder comprises a cylinder plate configured to be detachably connected to the upper die, wherein the piston plate has return members fixedly mounted on the piston plate and connected to the cylinder plate so as to be moveable relative to the cylinder plate.

3. The device according to claim 1, comprising a fluid line connecting the piston-cylinder unit with the forming tool.

4. The device according to claim 3, comprising a fluid separator arranged in the fluid line.

5. The device according to claim 3, comprising a pressure reducer arranged in the fluid line and further comprising a pressure check valve arranged downstream of the pressure reducer in the fluid line in a direction of flow of the hydraulic fluid.

6. A device for hydraulic forming of a blank under high pressure compressive conditions, the device comprising:

a forming tool comprising an upper die and a lower die, wherein the upper die and the lower die define a forming space;

a travel-limited mechanical press arranged above the forming tool and comprising a press plunger;

at least one piston-cylinder unit comprising a cylinder with an interior and a piston arranged in the interior of the cylinder, wherein the interior of the cylinder contains a hydraulic fluid;

wherein the press plunger is connected to the piston-cylinder unit remote from the upper die of the forming tool and wherein the piston-cylinder unit is configured to act on the upper die to generate a limited relative movement between the upper die and the press plunger; and wherein the piston-cylinder unit is configured to establish fluid communication between the interior of the cylinder and the forming space of the forming tool.

7. The device according to claim 6, wherein the piston of the at least one piston-cylinder unit comprises a piston plate configured to be detachably fastened to the press plunger, wherein the cylinder comprises a cylinder plate configured to be detachably connected to the upper die, wherein the piston plate has return members fixedly mounted on the piston plate and connected to the cylinder plate so as to be moveable relative to the cylinder plate.

8. The device according to claim 6, comprising a fluid line connecting the piston-cylinder unit with the forming tool.

9. The device according to claim 8, comprising a fluid separator arranged in the fluid line.

10. The device according to claim 8, comprising a pressure reducer arranged in the fluid line and further comprising a pressure check valve arranged downstream of the pressure reducer in the fluid line in a direction of flow of the hydraulic fluid.

* * * * *